United States Patent
Glass-Torchia et al.

(10) Patent No.: US 10,477,544 B2
(45) Date of Patent: Nov. 12, 2019

(54) SYSTEM AND METHOD FOR SHARING RF SIGNAL PROCESSING

(71) Applicant: RAYTHEON COMPANY, Waltham, MA (US)

(72) Inventors: Linda M. Glass-Torchia, Santa Barbara, CA (US); Nicholas S. Spears, Wylie, TX (US); Robert S. Loomis, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 85 days.

(21) Appl. No.: 15/847,606

(22) Filed: Dec. 19, 2017

(65) Prior Publication Data

US 2019/0191432 A1    Jun. 20, 2019

(51) Int. Cl.
| | | |
|---|---|---|
| *H04W 72/04* | (2009.01) | |
| *H04L 12/927* | (2013.01) | |
| *H04W 72/10* | (2009.01) | |

(52) U.S. Cl.
CPC ....... *H04W 72/0446* (2013.01); *H04L 47/801* (2013.01); *H04W 72/048* (2013.01); *H04W 72/10* (2013.01)

(58) Field of Classification Search
None
See application file for complete search history.

(56) References Cited

U.S. PATENT DOCUMENTS

| | | |
|---|---|---|
| 5,134,508 A | 7/1992 | Corda |
| 6,154,772 A | 11/2000 | Dunn et al. |
| 8,203,942 B2* | 6/2012 | Hernandez ............ H04L 47/125 370/230 |
| 9,668,172 B2* | 5/2017 | Randell ................. H04W 28/16 |
| 2003/0028642 A1* | 2/2003 | Agarwal ................. G06F 9/505 709/226 |
| 2011/0248796 A1 | 10/2011 | Pozgay |
| 2013/0300605 A1* | 11/2013 | Celentano ................ H01Q 3/30 342/372 |
| 2015/0305053 A1* | 10/2015 | Mintz ................... H04W 72/00 455/452.1 |

* cited by examiner

*Primary Examiner* — Ajit Patel
(74) *Attorney, Agent, or Firm* — Lewis Roca Rothgerber Christie LLP (57) ABSTRACT

A system for dynamically sharing RF front end resources includes a data processor; a plurality of RF front end resources; a plurality of signal processors for processing an RF signal and scheduling utilization of the plurality of RF front end resources; a digital platform interface (DPIF) for performing real-time resource arbitration and generating control data to share the RF front end resources by dynamically selecting and configuring the RF front end resources responsive to the RF task received by the data processor. The data processor selects a signal processor for technique generation based on availability of one or more of the plurality of signal processors, the selected signal processor makes a request to the DPIF for an RF front end resource allocation, and the DPIF grants an RF front end resource to the selected signal processor to receive or transmit the RF signal.

20 Claims, 6 Drawing Sheets

SYSTEM AND METHOD FOR SHARING RF SIGNAL PROCESSING

FIELD OF THE INVENTION

The present invention relates generally to signal processing in RF systems and more specifically to sharing and pooling resources in RF systems.

BACKGROUND

There is a desire to lower complexity and cost of radio frequency (RF) communications systems. The development and acquisition cost of an RF system is determined by the combination of the hardware, software, and firmware costs (material and engineering). However, the use of an RF system involves costs far beyond those incurred in the development and acquisition of an RF system. The integration of an RF system requires installation, power and cooling costs. Additionally, the ongoing use of the RF system requires operational costs to maintain system performance especially external antennas, which may need to endure environmental hazards. These costs continue to compound when multiple RF systems are used. As an example, an airborne vehicle may require the use of a radar, communications device, and electronic warfare (EW) system. The airborne platform in this example would host three RF systems and may require up to three antenna installations to support these systems. The use of the airborne platform would incur all the associated costs to acquire, install, and operate three RF systems. As RF antenna technology improves to cover wider frequency ranges with improved power efficiency, it is now possible to share an antenna between multiple RF systems. Sharing an RF antenna would reduce the overall number of antennas needed and directly reduce costs. In our example, one modern antenna may provide the frequency and power requirements needed for the airborne platform's Radar, communications device, and electronic warfare systems. This will reduce the acquisition costs of the RF systems some, but the largest cost savings are achieved from the reduction in power, cooling, and operational costs of using multiple RF systems. While advances in materials and manufacturing have led to modern antennas supporting multiple applications, the technology to utilize these modern antennas at timescales relevant to RF applications has lagged.

Figure 1:
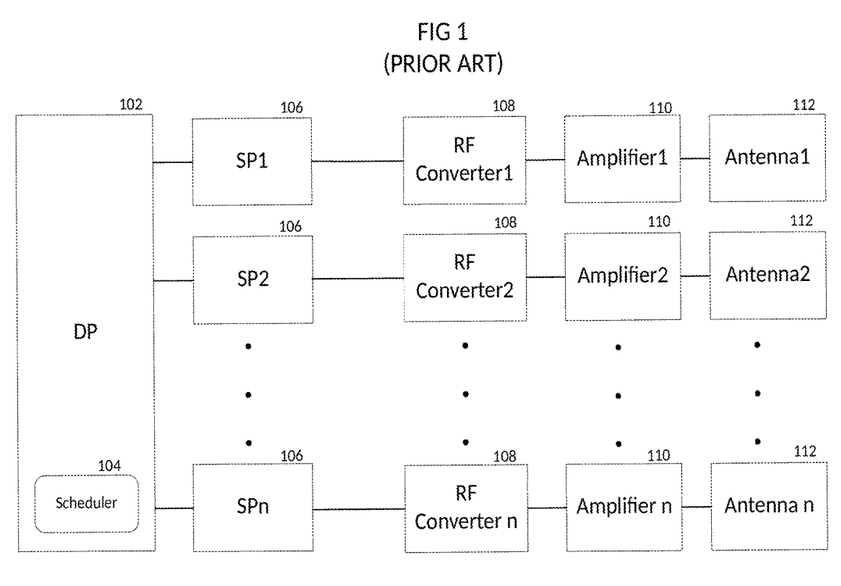
FIG. 1 is a simplified block diagram of a known digital RF transmit and receive system.

FIG. 1 is a simplified block diagram of a known digital RF transmit and receive system. As shown, one or more data processor (DP) cards 102 that include a processor, memory and associated I/O circuitry host general purpose application software. One or more signal processor (SP) cards 106 that include a processor (e.g., an image processor), memory and associated I/O circuitry typically contain signal processing software and firmware required to digitize received signals or synthesize signals for transmission. A system may have one to many SP cards 106 based on the capacity need of the system. A SP card (or module) may include a combination of digital signal processing circuits, software and firmware required to characterize the received RF signal or synthesize the RF signal for transmission. RF converters 108 shift analog signals in frequency either down or up to support receive and transmit modes, respectively. Amplifiers 110 and antennas 112 add additional power and directionality to the RF system both for receive and transmit modes.

As shown in FIG. 1, there is a one-to-one correspondence of SP cards 106 to RF converters 108, amplifiers 110, and antennas 112 (front end resources). Transmit and receive is scheduled by a scheduling routine 104 in the DP card 102. However, the resolution of the schedule is typically limited to around 100 milliseconds due to the computation time and latency of moving data from the DP through the system. This architecture has the benefit of a simple hardware design, where the number of SP cards would be sized based on the maximum expected number of concurrent system tasks. As an example, if each SP card 106 could process one task and the system was required to process 8 tasks simultaneously, the total number of required SP cards 106, RF converters 108, amplifiers 110 and antennas 112 would be 8.

Figure 2:
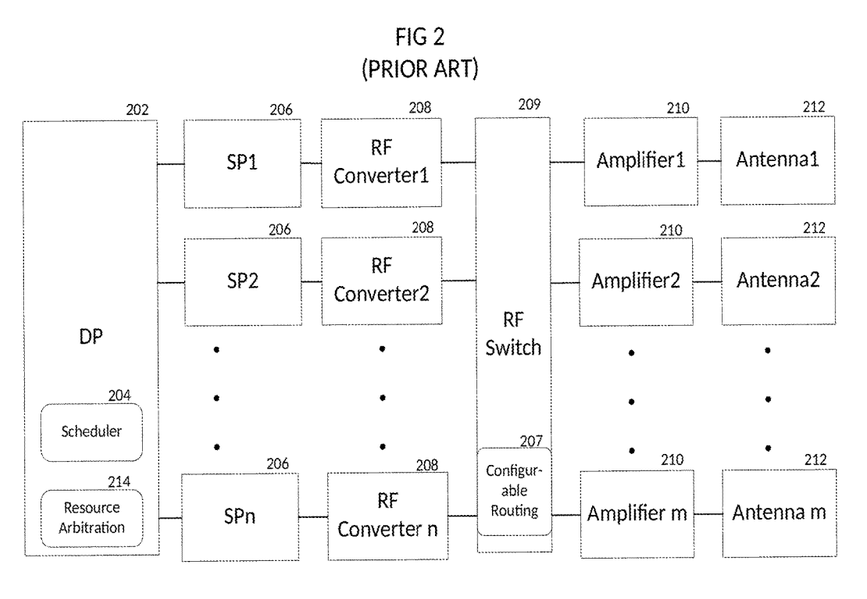
FIG. 2 is a simplified block diagram of a known digital RF transmit and receive system.

FIG. 2 is a simplified block diagram of a known digital RF transmit and receive system. This illustrated hardware and software architecture introduces an RF distribution that may be hard-wired or configured by a programmable RF switch 209 to provide more dynamic routing between the RF converters 208 and the amplifiers 210 and antennas 212 (front end resources), utilizing a configurable routing routine 207. Here, the number of front end resources (m) is typically less than the number of SP cards 206 (n). The number of SP cards 206 (n) is based on the maximum expected number of concurrent system tasks. The number of front end resources (m) may be reduced to lower the cost of the system. The number of front end resources may be reduced to the maximum expected number of simultaneous tasks within a 100 ms period of time (the resolution of the scheduler 204). Extending the previous example of FIG. 1, if the system is required to accommodate up to 8 tasks over several minutes and the probability over a 100 ms window of time that tasks needed front end resources was:

Probability of 1 task needing front end resources=55%
Probability of 2 tasks needing front end resources=20%
Probability of 3 tasks needing front end resources=15%
Probability of 4 tasks needing front end resources=6%
Probability of 5 tasks needing front end resources=2.5%
Probability of 6 tasks needing front end resources=1.0%
Probability of 7 tasks needing front end resources=0.4%
Probability of 8 tasks needing front end resources=0.1%

For example, a system may be designed with 8 SP cards 206 and 4 front end resources to provide sufficient resources for an anticipated 96% of system front end resources needs. In most cases, n>m. In the cases where the number of SP cards 206 (n) is greater than the number of front end resources (m), the DP 202 must provide resource arbitration 214 for the (4% of) requests that will require more front end resources than the system can provide.

However due to the resolution of the scheduler, these approaches typically lead to higher contention time and result in poor front end duty factor usage (e.g., resource dead time). Additionally, the complex RF distribution introduces cost and performance degradation to the system. The disclosed invention provides an improvement to the RF transmit and receive architecture to realize time sharing of front end resources to include RF antennas.

SUMMARY

In some embodiments, the disclosed invention is a system for dynamically sharing RF front end resources. The system includes a data processor for hosting and executing a general purpose application and receiving an RF task; a plurality of RF front end resources, each including an RF converter, an amplifier and an antenna for receiving or transmitting the RF signal and enhancing the RF signal; a plurality of signal processors for processing an RF signal and scheduling utilization of the plurality of RF front end resources, wherein a number of the plurality of RF front end resources is smaller than a number of the plurality of signal processors; a digital platform interface (DPIF) for performing real-time resource arbitration and generating control data to share the RF front end resources by dynamically selecting and configuring the RF front end resources responsive to the RF task received by the data processor. The data processor selects a signal processor for technique generation based on availability of one or more of the plurality of signal processors, the selected signal processor makes a request to the DPIF for an RF front end resource allocation, and the DPIF grants an RF front end resource to the selected signal processor to receive or transmit the RF signal.

In some embodiments, the disclosed invention is a method for dynamically sharing RF front end resources. The method includes: executing a general purpose application and receiving an RF task by a data processor; generating RF front end resource configuration based on information in the RF task; requesting RF front end resources, in real-time, for receiving or transmitting the RF signal and enhancing the RF signal, wherein the request includes a request for one-to-many RF states; selecting a signal processor for RF task execution based on availability of one or more of a plurality of signal processors; configuring one or more of the RF front end resources responsive to the RF task; and performing real-time resource arbitration to select an one-to-many RF state from the requested one-to-many RF states; generating control data to share the RF front end resources, wherein a number of the plurality of RF front end resources is smaller than a number of the plurality of signal processors; and granting an RF front end resource to the selected signal processor to receive or transmit the RF signal.

In some embodiments, the selected signal processor receives, from the data processor, coefficients used to dynamically determine a priority of the signal processor assigned task, wherein the priority is used by the DPIF when performing real time resource arbitration. In some embodiments, the data processor transmits RF converter configuration and antenna set-up information to the DPIF via a configuration bus, and wherein the DPIF routes the RF converter configuration and antenna set-up information to the RF converter and antenna. The antenna set-up information may include one or more of information for setting a center frequency in the RF converters and defining beam steering for an antenna.

BRIEF DESCRIPTION OF THE DRAWINGS

These and other features, aspects, and advantages of the present invention will become better understood with regard to the following description, appended claims, and accompanying drawings.

DETAILED DESCRIPTION

In some embodiments, the disclosed invention is a system and method to quickly pool RF front end limited resources to achieve desired system reaction timelines and reduce hardware cost, and size, weight and power (SWaP) by more efficient utilization of front end resources, for example, higher usage duty factor. This design and architecture is extendable to multi-function RF technology (e.g., radar, electronic warfare, communications, cyber, etc.) for RF front end resource sharing. The disclosed invention dynamically shares the front end resources (e.g., tuners, amplifiers, apertures) utilizing a centralized front end resource arbitration and SP data sharing.

This way, the disclosed invention provides an efficient and low cost-low complexity support for multiple, simultaneous RF tasks when front end resources are time shared. This provides the ability to achieve the same performance with fewer front end resources than those needed in previous architectures, to maintain performance without the use of an RF switch or complex RF distribution, and provide an increase in capacity for handling tasks with durations under 100 ms due to the improved resolution of the scheduler (for the same number of SPs).

Figure 3:
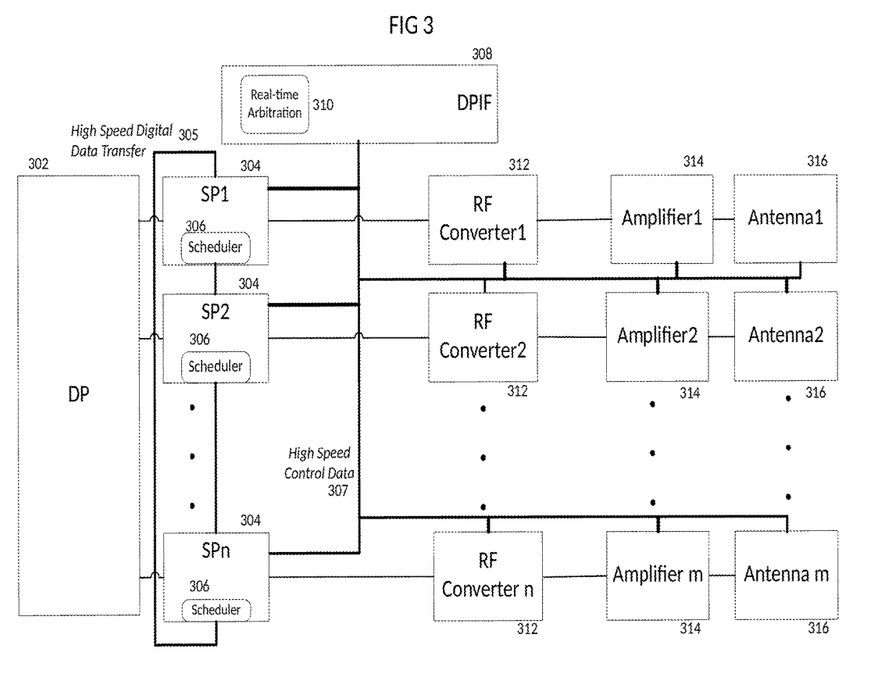
FIG. 3 is an exemplary block diagram of a digital RF transmit and receive system, according to some embodiments of the disclosed invention.

FIG. 3 is an exemplary block diagram of a digital RF transmit and receive system, according to some embodiments of the disclosed invention. In these embodiments, the disclosed invention includes a combination of some or all the following components and features. As shown, the system includes a data processor (DP) 302, a high speed data transfer mechanism 305 between multiple signal processor (SP) cards 304, a software and firmware scheduler 306 within one or more SP cards 304, a digital platform interface (DPIF) card 308 that hosts firmware that performs real-time arbitration 310 generates high speed control data 307 that defines which configuration to enable for each front end resource.

The high speed configuration selection and enable data 307 is then routed to the appropriate front end resource, such as RF converter 312, amplifier 314 and antenna 316 for signal receipt or transmission and enhancement of such signals. Each DP, SP and DPIF card includes circuitry for executing software and/or firmware, including for example, a processor, memory and associated I/O circuits. More detailed description is provided below with respect to FIGS. 4 and 5.

Figure 4:
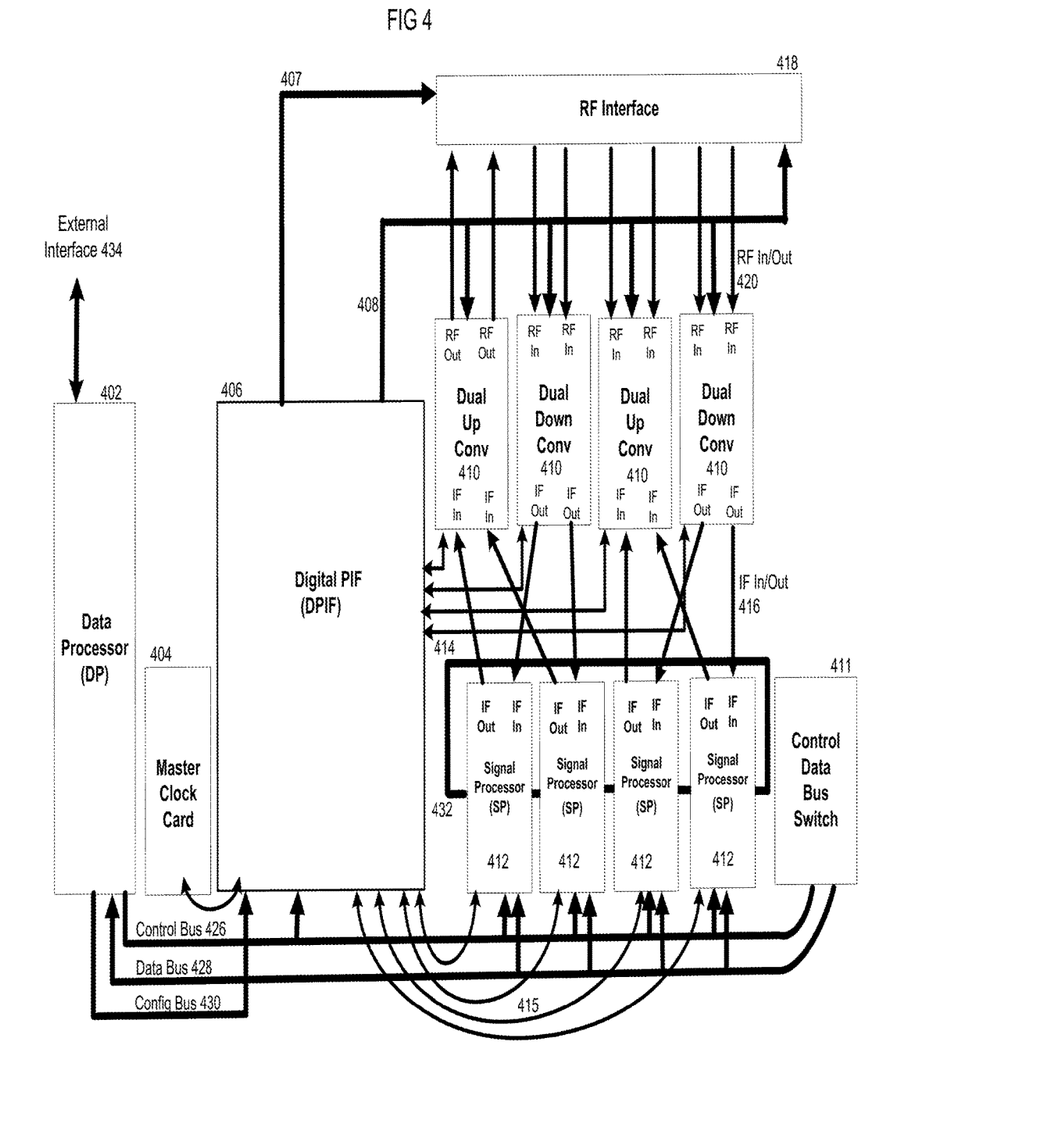
FIG. 4 is an exemplary circuit block diagram of a digital RF transmit and receive system, according to some embodiments of the disclosed invention.

FIG. 4 is an exemplary circuit block diagram of a digital RF transmit and receive system, according to some embodiments of the disclosed invention. As shown, one or more DP circuits 402 host general purpose application software, for example for a radar, a communication device, or an electronic warfare system. The DP circuits 402 assign processing to the SP modules 412 via a data bus 428. A control data bus switch 411 provides the route selection and connectivity between the DP circuits 402 and the SPs 412 or DPIF 406, via the control bus 426 and the data bus 428. The DP circuits 402 send RF converter configuration and antenna set-up to the DPIF 406 via the configuration bus 430. In some embodiments, the RF converter configuration and antenna set-up define the programmable configuration of the RF converters or antennas, respectively.

The composite of each front end component configuration forms a single RF state. Each task assigned to an SP includes the RF state which will be enabled for the SP to perform the assignment. For example, to perform electronic attack on an assigned emitter, the RF state includes the RF converter configuration that tunes the RF converter to the frequency range in which the emitter is transmitting and the desired RF converter attenuation setting; and the antenna configuration (e.g., available polarization settings, beam configuration options including spoiling). In some embodiments, this information may be stored in the RF task received by the DP circuits 402 or a configuration data file (CDF) accessed by the DP circuits 402.

The DPIF 406, driven by a high speed clock produced by a master clock circuit 404, generates a tuner control signal 414 that is sent to the RF converter defined in the RF state. The DPIF 406 has the ability to configure a plurality of RF converters 410 (here, four down converters and two up converters are shown) to down convert or up convert the RF signal 420 to the intermediate frequency range signals 416 that can be processed by the SPs 412. The DPIF 406 routes the RF converter configuration signals 414 and the antenna set-up signals 407. Additionally, the DPIF 406 maintains the RF converter configurations data and antenna set-up data that includes the interoperability data associated with the assigned RF states, internally for use in its arbitration processing. The interoperability data defines which RF states are compatible with other RF states, meaning they can occur simultaneously without interfering with one another.

When executing the DP 402 assigned processing, the SPs 412 independently request RF states 415 from the DPIF 406. Based on the simultaneity, priority and interoperability of these real-time requests, the DPIF 406 arbitrates the RF state requests and decides whether to grant or deny each request. The DPIF 406 sends an RF state response 415 to the requesting SP. For the granted RF states, the DPIF 406 sends the RF converter enable and antenna enable signals 408 to the one or more selected RF converter(s) 410 and the RF interface circuit 418. The RF converter and antenna enable signals 408 include which configuration to enable.

In a transmit mode, the RF signal is input to an RF interface circuit 418 for transmission via RF I/O ports 420, after being processed by a SP 412 and up converted by an RF converter 410. In a receive mode, the RF signal is received by the RF interface circuit 418 and routed to one or more selected RF converters 410 for down conversion and then to one or more selected SPs 412 for signal processing, before it is sent to the DP circuit 402 via the data bus 426. The RF interface circuit 418 and the SPs 412 support front end time sharing utilizing the scheduling and arbitration processes performed by the DPIF 406, resulting in a less complex and lower cost RF distribution circuit.

In FIGS. 3 and 4, the use of the high speed data transfer interfaces allows for removal of the configurable RF switch (e.g., 209 in FIG. 2) and still reduces the number of front end resources. Additionally, by moving the scheduler and arbitration logic out of the DP 402 and into one or more SPs 412 and DPIF 406 respectively, the disclosed invention improves the resolution of the scheduler from 100 ms to 1 µs, because the deployment of the scheduler on the SPs 304 takes advantage of the SP 304 processing resolution of 1 µs and eliminates the latency of moving data from the DP 102 through the system. The disclosed invention also reduces the number of front end resources (m) based on the maximum expected number of simultaneous tasks within, for example, a 1 µs period of time (the improved resolution of the scheduler).

Compared to the previous approaches, for the same task load on the system, the probability of simultaneous system tasks in a 100 ms time window for previous approaches is much greater than the probability of simultaneous system tasks in a 1 µs window of the present invention. In many cases (with appropriate performance characteristics), the use of shared front end resource reduces the number of front end resources required to m=1.

In some embodiments, the DP software retrieves and utilizes, from a configuration data file (CDF), pooled resource compatibility data which describes which SPs 412 can support which processes. In some embodiments, the CDF is received over a computer network and stored within the DP. This type of data enforces pooled resource constraints (e.g., a maximum number of SP hops that are allowed based on latency tolerances). In some embodiments, the DP software also retrieves and utilizes, from the CDF, coefficients used to dynamically determine the task priority. In some embodiments, the task priority is computed based upon the type of task that is assigned to an SP, the lethality of the emitter(s) of interest that the task is processing, the time interval that has elapsed since the last time the task was performed and/or the coefficients provided in the CDF. The information in the CDF varies based on system requirements, type of the RF task, type of the engagement, etc., as further described below.

In some embodiments, the RF states are created and released as needed in an RF state table, as further described below with respect to FIG. 5. The DP software sends one-to-many RF state table indices, emitter information and technique parameters to an SP 412 to start an engagement. In some embodiments, the software executing on a SP 412 receives the one-to-many RF state table indices, emitter information, and technique parameters from the DP 402 to start processing an engagement.

In some embodiments, the SP firmware receives coefficients used to determine the level of SP resource arbitration from DP 402 and requests from the DPIF the one-to-many RF states (depending on the level of group engagements) for engagements that pass the SP resource arbitration. The SP firmware then receives the current enabled RF state from the DPIF 406 via the high speed data interface 414, receives data over a SP-to-SP interface(s) high speed data transfer mechanism 305 in FIGS. 3 and 428 in FIG. 4.

In some embodiments, the firmware executing on the DPIF receives multiple RF state requests per engagement from multiple SP's firmware, loads RF state compatibility data (e.g., simultaneous Tx/Rx rules), enables RF states based on requested RF states from SP firmware and returns the RF states that will be enabled.

Figure 5:
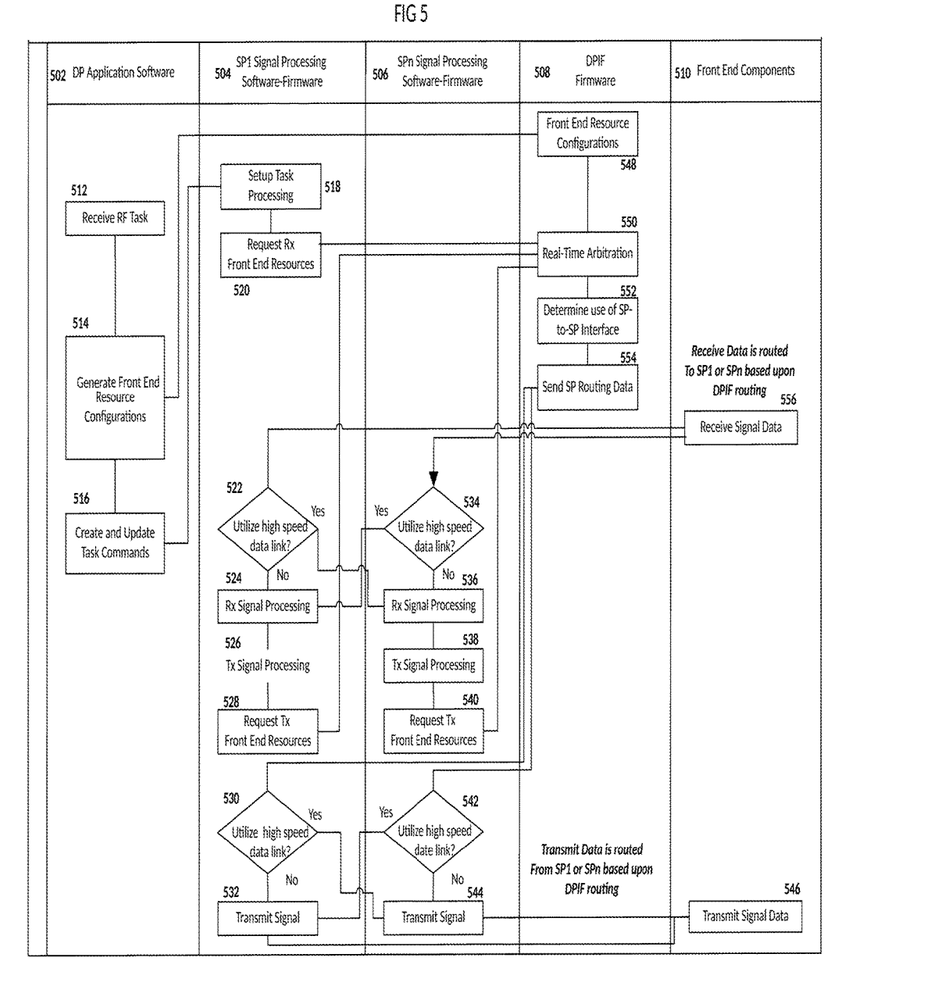
FIG. 5 is an exemplary process flow for scheduling shared front end resources, according to some embodiments of the disclosed invention.

FIG. 5 is an exemplary process flow for scheduling shared front end resources, according to some embodiments of the disclosed invention. Each processing block 512-556 is shown under the software/firmware module that executes that process block, for example, application software 502 that may be executed by one or more DPs 402, $SP_1$ signal processing software/firmware 504 that may be executed by one or more SPs 412, $SP_n$ signal processing software/firmware 506 that may be executed by one or more SPs 412, DPIF firmware 508 that may be executed by DPIF 406, and front end components (resources) 510 including RF converters, amplifiers, and antennas. As shown in block 512, an RF task is received by the DP application software. An example of an RF task may include one or more of a request to send data over a communications link, a need or requirement to start an electronic warfare (EW) countermeasure, or a request to search an area with a radar.

Based on the received RF task, the DPIF firmware 508 configures front end resources in block 548. If the RF task is to initiate an EW countermeasure, the application software executed on the DP 402 receives the request over its external interface 434. The application software uses data stored on the DP 402 to determine the required front end resources, such as RF converter, amplifier, and antenna settings required for the EW countermeasure. These settings are sent to the DPIF 406 from the DP 402, for example, over the configuration bus 430 shown in FIG. 4. In some embodiments, the DPIF 406 assigns an integer value to each component configuration. For the RF converters, this is called the RF converter profile ID and for the antennas, this is called the antenna profile ID. DPIF 406 then uses configuration interface 414 to send the DP 402 defined RF configuration with RF converter profile ID to the RF converters 410 and uses the configuration interface 407 to send the DP 402 defined antenna configuration with antenna profile ID to the antenna. The RF converters and antenna store their received configuration internally in a look-up table that is accessible by the assigned profile ID.

In some embodiments, the configuration settings includes information for setting the center frequency in the RF converters and/or defining beam steering for an AESA antenna. For example, the data on the EW countermeasure may require a center frequency of 12 GHz with a beam steering of 10° off antenna boresight. In this example, the DPIF 406 internally binds the RF converter profile ID with the antenna profile ID, assigns an RF state index to this unique front end configuration, communicates with the various front end resources and then provides this index back to the DP 402 application. This index can then be used as a high speed pointer to a preset configuration. This reduces the message size needed to request a desired front end resource configuration and maintains fast system response time.

In block 514, front end resource configurations are generated for utilization of SP-to-SP high speed data transfer 432. In some embodiments, the disclosed invention allows the application software in the DP to determine when the SP-to-SP interface may be enabled. The rules driving the use of the SP-to-SP interface are known to the application software based on data stored on the DP. The SP-to-SP interface may not be desired for some applications with extremely low latency throughput requirements. In a case that an application, such as an EW countermeasure is able to utilize the SP-to-SP interface, the routing information is sent to the DPIF from the DP to allow the DPIF to route the EW countermeasure over the SP-to-SP interface. In block 516 tasks commands are created or updated based on the application software executed on the DP 402. These task commands may include starting technique generation SP software/firmware to support the requested EW countermeasure task. The task processing is set up in block 518. This part of the process flow encompasses the various initialization activity associated with receiving or transmitting RF. In some embodiments, the initialization of technique generation firmware with parameters such as modulation settings or noise bandwidths is performed in block 518, as part of task processing.

A first SP 412, executing $SP_1$ signal processing software/firmware 504, requests Rx front end resources in the case of a receive mode, in block 520. The scheduler in the DPIF then performs real-time arbitration for the front end resources, in block 550. In some embodiments, in a case of EW countermeasure example, the application software on the DP 402 selects an SP 412 to host the technique generation software and firmware based on availability of SP resources (e.g. free processors, firmware components, etc). Once the SP 412 software/firmware is initialized in block 518, it begins making resource requests to the DPIF over interface 415, using an index established by block 548. If $SP_1$ is selected to host the technique generation required for the EW countermeasure and it requires the system to receive RF signals, $SP_1$ sends a request to the DPIF. If other processes on the same or other SP cards 412 also need the system front end resources at the same time as the EW countermeasure, the real-time arbitration in block 550 determines the configuration of the front end resources based on priority rules known to the DPIF 406.

The use of SP-to-SP interface is then determined in blocks 552 and 554. The DPIF firmware 508 generates routing or control data to the appropriate frond end resources for selection of such appropriate frond end resources. In some embodiments, where the system does not include an RF switch (to improve performance, reduce cost, reduce weight, etc), the front end resource configuration associated with $SP_1$'s primary IF path 416 was not compatible with our EW countermeasure (due to a task on SP1 with higher priority than our EW countermeasure determined by Block 550), and front end resource "dead time" available, then the DPIF commands the front end resources accessed by $SP_n$ over interface 416 to the configuration needed to support the EW countermeasure, in block 552. The routing decisions are then sent back to all SPs over interface 415, in block 554.

Figure 6:
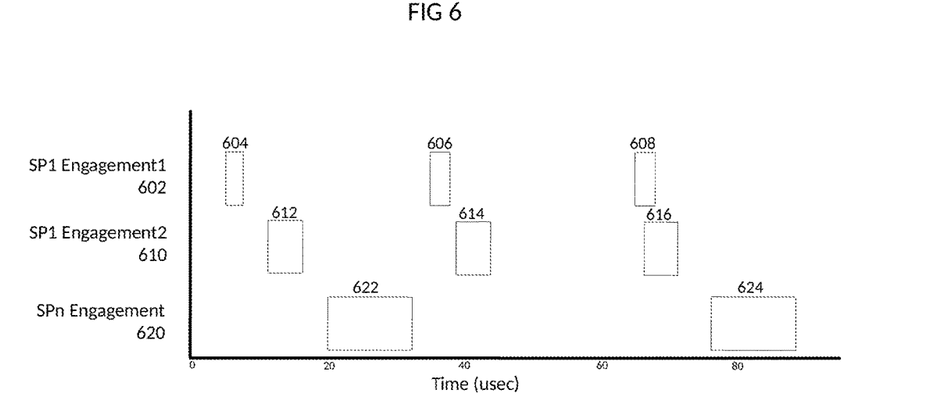
FIG. 6 illustrates an exemplary timeline of engagements for a SP-to-SP data transfer, according to some embodiments of the disclosed invention.

As one example of when a SP-to-SP high data transfer is desirable, consider a system that is comprised of two SPs 504 and 506 that are able to both transmit and receive so each SP has only one receive input signal and the system is servicing multiple simultaneous electronic attack engagements. $SP_1$ 504 is assigned two engagements and $SP_2$ 506 is assigned one engagement. Furthermore, each engagement has a unique RF state, meaning that when an SP is receiving one engagement signal it is unable to receive another engagement signal. FIG. 6 represents the desired receive timeline of the three engagements where each rectangle represents a receive time interval called an Rx dwell. $SP_1$ Engagement1 602 requests Rx dwells 604, 606 and 608; $SP_1$ Engagement2 610 requests Rx dwells 612, 614 and 616; and $SP_2$ Engagement 620 requests Rx dwells 622 and 624. Each Rx dwells is requested in real-time, within 1 usec, which is the resolution of the scheduler. The DPIF arbitrates between Rx dwells 608 and 616, enabling $SP_1$ 504 to receive the Rx dwell 608 data and $SP_2$ 506 to receive Rx dwell 616 data that is then routed to $SP_1$ 504.

Referring back to FIG. 5, in block 556, the receive data is then routed to the appropriate SP (e.g., $SP_1$ and/or $SP_n$). Then, in blocks 522 and 534, the routing decisions provided by the DPIF via block 554 are used to send received data to the appropriate SP, by $SP_1$ and $SP_n$, respectively. If use of the high speed data link is required to route data to the appropriate SP (block 522), $SP_1$ sends the data to $SP_n$ for Rx signal processing (block 536) or Tx signal processing (block 538), depending whether the system is in a receive mode or transmit mode.

In block 528 and 540, Tx front end resources are requested by respective $SP_1$ and $SP_n$. Again, in blocks 530 and 542, the routing decisions provided by the DPIF via Block 554 are used to send transmit data from the appropriate SP, by $SP_1$ and $SP_n$, respectively. If use of the high speed data link is required to route data from the appropriate SP, that SP sends the data to the other SP to be transmitted (blocks 532 and 544). In cases where data routing between SPs is not required (for example, when there are no resource conflicts in the system), the SP processes the data for transmission over its own (blocks 532 and 544) front end resources via interface 416. The data is then transmitted in block 546 via the front end components 510.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended drawings and claims.

The invention claimed is:

1. A system for dynamically sharing radio frequency (RF) front end resources comprising:
    a data processor for hosting and executing a general purpose application and receiving an RF task via an RF signal;
    a plurality of RF front end resources, each including an RF converter, an amplifier and an antenna for receiving or transmitting the RF signal and enhancing the RF signal;
    a plurality of signal processors for processing an RF signal and scheduling utilization of the plurality of RF front end resources, wherein a number of the plurality of RF front end resources is smaller than a number of the plurality of signal processors;
    a digital platform interface (DPIF) for performing real-time resource arbitration and generating control data to share the RF front end resources by dynamically selecting and configuring the RF front end resources responsive to the RF task received by the data processor, wherein the data processor selects a signal processor for technique generation based on availability of one or more of the plurality of signal processors, wherein the selected signal processor makes a request to the DPIF for an RF front end resource allocation, and wherein the DPIF grants an RF front end resource to the selected signal processor to receive or transmit the RF signal.

2. The system of claim 1, wherein the selected signal processor receives, from the data processor, coefficients used to dynamically determine a priority of the signal processor assigned task, wherein the priority is used by the DPIF when performing real time resource arbitration.

3. The system of claim 1, wherein the selected signal processor receives, from the DPIF, results of the DPIF real time arbitration.

4. The system of claim 1, wherein the data processor transmits RF converter configuration and antenna set-up information to the DPIF via a configuration bus, and wherein the DPIF routes the RF converter configuration and antenna set-up information to the RF converter and antenna.

5. The system of claim 4, wherein the RF converter configuration includes one or more of information for setting a center frequency in the RF converters and the antenna set-up information includes one or more information defining beam steering for an antenna.

6. The system of claim 1, wherein one or more of the plurality of signal processors request RF states from the DPIF, and based on simultaneity, priority and interoperability of said requests, the DPIF arbitrates the RF state requests and decides whether to grant or deny each request.

7. The system of claim 1, wherein the data processor receives, from a configuration data file (CDF), pooled resource compatibility data describing which signal processor can support which processes.

8. The system of claim 6, wherein the data processor further receives, from the CDF, aperture information, available polarization settings, beam configuration options, RF path attenuation settings, and frequency band break definitions required to support a system configuration.

9. The system of claim 1, wherein the selected signal processor receives, from the data processor, one-to-many RF state table indices, emitter information and technique parameters to start an engagement.

10. The system of claim 8, wherein the DPIF receives RF state requests from the selected signal processor, loads RF state compatibility data, enables RF states based on requested RF states and returns the RF states to be enabled to the signal processor.

11. The system of claim 8, wherein the RF task includes one or more of a request to send data over a communications link, a requirement to start an electronic warfare countermeasure, and a request to search an area with a radar.

12. A method for dynamically sharing radio frequency (RF) front end resources, the method comprising:
    executing a general purpose application and receiving an RF task via an RF signal, by a data processor;
    generating RF front end resource configuration based on information in the RF task, by the data processor;
    selecting a signal processor for RF task execution based on availability of one or more of a plurality of signal processors, by a digital platform interface (DPIF);
    requesting RF front end resources, in real-time, for receiving or transmitting the RF signal and enhancing the RF signal, by the selected signal processor, wherein the request includes a request for one-to-many RF states;
    configuring one or more of the RF front end resources responsive to the RF task, by the DPIF; and
    performing real-time resource arbitration to select an one-to-many RF state from the requested one-to-many RF states, by the DPIF;
    generating control data to share the RF front end resources, wherein a number of the plurality of RF front end resources is smaller than a number of the plurality of signal processors, by the DPIF; and
    granting an RF front end resource to the selected signal processor to receive or transmit the RF signal, by the DPIF.

13. The method of claim 12, further comprising receiving coefficients for dynamically determining a priority of the signal processor assigned task, wherein the priority is used by the DPIF when performing real time resource arbitration.

14. The method of claim 12, further comprising transmitting RF converter configuration and antenna set-up information, and routing the RF converter configuration and antenna set-up information to the RF front end resources granted to the selected signal processor.

15. The method of claim 14, wherein the RE converter configuration includes one or more of information for setting a center frequency in the RF converters and the antenna set-up information includes one or more information defining beam steering for an antenna.

16. The method of claim 1, further comprising:
    forming a plurality of RF states, wherein each task assigned to a selected signal processor includes an RF state that is enabled for the selected signal processor to perform an assignment;
    requesting an RF state by the selected signal processor; and
    arbitrating the RF state request.

17. The method of claim 12, further comprising receiving from a configuration data file, pooled resource compatibility data describing which signal processor can support which assignment.

18. The method of claim 17, further comprising receiving from the configuration data file, aperture information, available polarization settings, beam configuration options, RF path attenuation settings, and frequency band break definitions required to support a system configuration.

19. The method of claim 12, further comprising receiving from the data processor, one-to-many RF state table indices, emitter information and technique parameters to start an engagement.

20. The method of claim 19, wherein the RF task includes one or more of a request to send data over a communications link, a requirement to start an electronic warfare countermeasure, and a request to search an area with a radar.

* * * * *